US009035523B2

(12) United States Patent
Podack (10) Patent No.: US 9,035,523 B2
(45) Date of Patent: May 19, 2015

(54) COIL FOR AN ELECTRIC MACHINE AND METHOD FOR PRODUCING A COIL

(75) Inventor: Marcus Podack, Wuerzburg (DE)

(73) Assignee: Brose Fahrzeugteile GmbH & Co. KG, Würzburg, Würzburg (DE)

( * ) Notice: Subject to any disclaimer, the term of this patent is extended or adjusted under 35 U.S.C. 154(b) by 268 days.

(21) Appl. No.: 12/991,034

(22) PCT Filed: May 5, 2009

(86) PCT No.: PCT/DE2009/000598
§ 371 (c)(1),
(2), (4) Date: Dec. 1, 2010

(87) PCT Pub. No.: WO2009/135465
PCT Pub. Date: Nov. 12, 2009

(65) Prior Publication Data
US 2011/0127872 A1 Jun. 2, 2011

(30) Foreign Application Priority Data

May 5, 2008 (DE) .................. 10 2008 022 170

(51) Int. Cl.
*H02K 3/00* (2006.01)
*H02K 3/04* (2006.01)
(Continued)

(52) U.S. Cl.
CPC .............. *H02K 3/18* (2013.01); *H02K 15/0421* (2013.01); *H02K 3/522* (2013.01)

(58) Field of Classification Search
CPC ................................... H02K 1/18; H02K 1/12
USPC .......... 310/180, 208, 201, 202, 203, 216.073, 310/216.074, 216.079, 216.85, 216.99, 310/216.101, 216.102; 29/596
See application file for complete search history.

(56) References Cited

U.S. PATENT DOCUMENTS 3,382,570 A * 5/1968 Kanpp et al. ................. 29/598
3,868,766 A * 3/1975 Gramlich et al. ............. 29/596
(Continued)

FOREIGN PATENT DOCUMENTS

DE 625908 C 2/1936
DE 2632081 A * 12/1977
(Continued)

OTHER PUBLICATIONS

Machine Translation DE2632081 (1977), DE4004019 (1991), JP2006060976 (2006).*
(Continued)

*Primary Examiner* — Jose Gonzalez Quinones
(74) *Attorney, Agent, or Firm* — Edward J. Stemberger; Manelli Selter PLLC (57) ABSTRACT

The invention relates to a coil (1), in particular for an electric machine, in particular a transformator or an electromechanical converter, in particular an electric motor, for guiding an electric current for producing a magnetic field. Said coil consists of individual windings (2) that are essentially embodied as a flat body thus obtaining a tightly packed structure when the windings (2) are superimposed, and respectively, each winding (2) comprises at least one circulating conductor path with the exception of at least one electric interruption on one side. Said conductor path of a winding (2) comprises, on one point, an electroconductive connection with a conductor path of an adjacent winding (2). The windings (2) are incidentally, essentially electrically isolated to each other.

21 Claims, 7 Drawing Sheets

(51) Int. Cl.
    *H02K 15/04*     (2006.01)
    *H02K 3/18*     (2006.01)
    *H02K 3/52*     (2006.01)

(56) References Cited

U.S. PATENT DOCUMENTS

| | | | | |
|---|---|---|---|---|
| 4,714,576 | A | * 12/1987 | Cotton et al. | 264/46.5 |
| 6,614,093 | B2 | * 9/2003 | Ott et al. | 257/531 |
| 2003/0127935 | A1 | * 7/2003 | Mori et al. | 310/206 |
| 2005/0046538 | A1 | 3/2005 | Maruyama | |
| 2007/0080600 | A1 | 4/2007 | Miyashita et al. | |
| 2008/0191578 | A1 | * 8/2008 | Evans | 310/217 |

FOREIGN PATENT DOCUMENTS

| | | | |
|---|---|---|---|
| DE | 2632081 | A1 | 12/1977 |
| DE | 4004019 | A * | 8/1991 |
| DE | 4004019 | A1 | 8/1991 |
| JP | 08182229 | A * | 7/1996 |
| JP | 2003143782 | A * | 5/2003 |
| JP | 2003164089 | A * | 6/2003 |
| JP | 2005318669 | A * | 11/2005 |
| JP | 2006050755 | A * | 2/2006 |
| JP | 2006060976 | A * | 3/2006 |
| JP | 2007020372 | A * | 1/2007 |
| WO | 9112619 | A1 | 8/1991 |

OTHER PUBLICATIONS

Machine Translation JP2007020372 (2007).*
Machine Trnaslation JP2005318669 (2003).*
Machine Translation JP2003164089 (2003).*
International Search Report in PCT/DE2009/000598.

* cited by examiner

COIL FOR AN ELECTRIC MACHINE AND METHOD FOR PRODUCING A COIL

The invention relates to a coil, in particular for an electric machine, a method for producing a coil, and a method for manufacturing a stator.

It is known to produce a meandering winding system, as disclosed in WO 01/54250.

A disadvantage with the known system in the prior art is that the conductor loops have to be subsequently introduced into the grooves of the already prepared stators and attached, in particular provided with contacts, using complex methods.

The object of the present invention is to provide a coil and a stator for an electric machine which can be easily and reliably produced and which has at the same time a high degree of filling of a conductive material, and to make available a reliable production method for a coil and a stator, respectively.

The object is achieved by means of a coil, in particular for an electric machine, in particular for a transformer or an electromechanical converter, in particular an electric motor, for conducting an electric current for generating a magnetic field, wherein the coil is composed of individual turns, and the turns are embodied essentially as flat bodies, in such a manner that a dense package with turns arranged one on top of the other is obtained, and in each case a turn has at least one circumferential conductor track with the exception of at least one electrical interruption on one side, and the conductor track of a turn at one location has an electrically conductive connection to a conductor track of an adjacent turn, wherein the turns are, apart from that, essentially electrically insulated from one another.

The means of achieving the object provides a coil which is of simple design and is composed of individual turns in the sense of divided flat sections, wherein the winding heads which are produced on head sides of the coil are made much smaller since the conductive connections are provided on the side and preferably not in the head region of the coil. This produces a smaller axial installation space of the electric machine, which is very important for many applications which suffer, in particular, from a lack of space. In addition, it leads to savings in material.

Owing to the flat design of the turns, it is possible to accommodate more conductive material, in particular copper, with the same groove area, which is provided for the fitting on and securing of the coil, and number of turns. This leads to a situation in which the coil resistance is reduced and a larger torque is obtained in the field weakening area. In addition, given the same groove area it is possible to accommodate more turns, with the result that a larger flow is possible and therefore a larger torque. The coils can be completed and checked in advance outside the electric machine.

Through the formation of contacts by the conductive connections in the side area of the coil, a very large installation space for the formation of all the contacts of the turns is available.

A reliable and simple way of forming contacts between various turns of a coil is obtained if the essentially gap-shaped interruptions between adjacent turns are, in particular, arranged offset and/or wherein the electrically conductive connections between adjacent turns are arranged offset, wherein the electrically conductive connection is arranged, in particular, in the direct vicinity of the essentially gap-shaped interruption of a turn.

The working area during the production process is utilized better if the essentially gap-shaped interruptions and/or the electrically conductive connections of the turns for each of the successive turns are each arranged offset by a predetermined distance with respect to the connection and/or the interruption of, the preceding turn. In addition, it is possible in this way to produce the following connection even given tight packages without disruption of an adjacent connection.

The assembly of the coil from the turns is made simpler and more reliable if the essentially gap-shaped interruptions and/or the electrically conductive connections of the turns are arranged on one longitudinal side of the coil.

In order to obtain a more dense package, different shapes and design possibilities can be used if the properties of the turns, in particular the flat cross sections of the turns, are adapted to the respective requirements, in particular are also embodied in different ways within a coil, wherein the turns are, in particular, embodied as rectangular flat bodies.

A simple and cost-effective production is possible if the turns are embodied, in particular punched, from a conductive sheet-metal strip material, in particular a copper strip.

A safe design is obtained if the turns, with the exception of the electrically conductive connection, are electrically insulated from one another, in particular by means of a thin insulating layer, in particular made of paper and/or varnish and/or oxide.

It is advantageous if the electrically conductive connection between the turns is to be formed by means of hard soldering and/or mechanical pressure and/or soldering under a protective gas atmosphere or the like. The production by means of hard soldering under a protective atmosphere permits rapid and safe production, wherein in particular a plurality of turns can be electrically connected in one working step. This can be done, for example, in a short time by means of rapid inductive heating. In particular, in addition a connecting means can be positioned galvanically and/or by means of a small plate, on the point to be connected, and the turns can be laid one on top of the other. Pre-tension for the generation of short-term heating to a melting temperature can then be applied, wherein a protective gas atmosphere is preferably applied.

A high degree of simplification in terms of assembly of electrical machines is provided if the coil can be assembled outside the electric machine, including the electrically conductive connections between the turns, and is to be only subsequently inserted into the electric machine. The coil can therefore also be connected electrically at points which are inaccessible in the inserted state, which makes available a relatively large working area. In addition, the finished coil can be stored separately from the stator or else can be used in a flexible way in different electric machines, such as also transformers.

It is advantageous if, after the assembly, the coil is introduced into the stator in such a way that the essentially gap-shaped interruptions and/or the electrically conductive connections are arranged in a groove region of the stator.

It is advantageous if the interruption is embodied in a way which is adapted in accordance with the electrical requirements.

A reliable electrical contact is made possible if a contact region for a current connection is provided at at least one end-side turn of the coil, wherein the contact region is provided, in particular, with a solder strip for a soldering process, in particular with a tin layer, and/or the contact region and/or wherein the contact region, in particular, has welding beads or welding bumps for the further formation of electrical contact. The contact regions can be produced after or before the installation of the coil in an electric machine.

In order to securely store a coil outside an electric machine it is advantageous if the windings are provided with a corrosion-reducing or corrosion-protection layer.

A flexible design of an electric machine is possible if the two end-side turns each have a contact region, wherein the two contact regions of the end-side turns are arranged at a winding end, and/or in each case a contact region is provided on one of the two winding ends lying opposite one another.

Better mechanical connection of the turns to one another is possible if in particular before electrical contact is formed, the turns, with the exception of the regions of the electrically conductive connections of the turns to one another, are provided with an adhesive layer, in particular for a bonding process which can be activated thermally, wherein the adhesive layer is, in particular, thicker than the insulating layer.

The object is also achieved by means of a stator of an electromechanical converter with an internal rotor or an external rotor, wherein the stator has at least one coil, wherein the stator has a divided structure, in particular a star yoke structure, and the coil is fitted onto a tooth of the star in the sense of an individual tooth coil.

The turns of an individual tooth-coil are made smaller in the vicinity of a foot region of a tooth than in a shoulder region of a tooth.

Simplified design and cost-saving production is possible if a plurality of coils are provided at their contact regions with a contact unit for the simultaneous formation of contacts.

The object is also achieved by means of a method for manufacturing a coil, wherein essentially rectangular flat turns, which have an essentially gap-shaped interruption in a longitudinal region, are arranged one on top of the other and in each case adjacent turns are connected by means of a conductive connection in the longitudinal region using a connecting method, wherein the coil is preferably assembled outside the electric machine, including the electrically conductive connections between the turns, and is only subsequently inserted into the electric machine.

It is advantageous if the electrically conductive connections between the turns are formed, in particular simultaneously between a plurality of turns or all the turns by means of soldering, in particular hard soldering, in particular under a protective gas atmosphere and/or mechanical pressure or the like.

For the sake of a secure connection, a bonding agent which can be activated thermally is preferably used for mechanically securing the turns to one another, in particular before the turns are insulated from one another.

The object is also achieved by means of a method for manufacturing a stator, having a coil, wherein the coil is formed by stacking up individual flat turns outside the stator and is soldered together in order to produce individual, electrically conductive connections in the groove region of the stator, and is subsequently fitted on in each case as a coil package onto, in each case, one tooth of a star of a star yoke structure, and subsequently after the fitting on of the star, the star is inserted into the yoke.

Further features and advantages of the invention emerge from the claims and the description below in which exemplary embodiments of the subject matter of the invention are explained in more detail in conjunction with the drawings. The statements in the following embodiments are not restrictive but are to be understood as merely exemplary.

Figure 1:
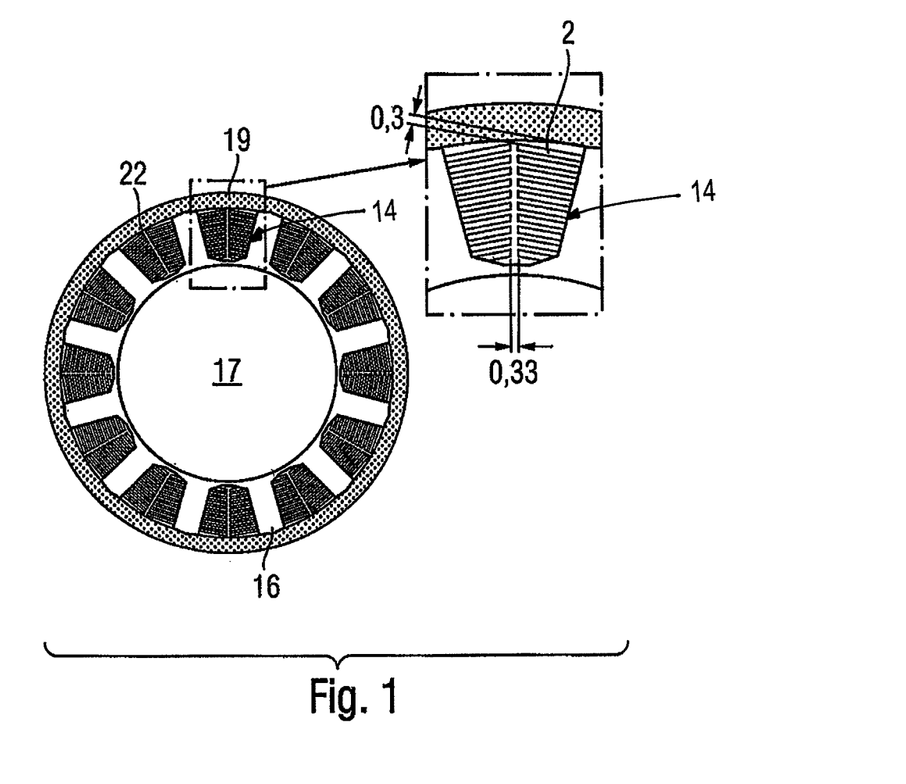
FIG. 1 shows a schematic section through a star yoke structure of an electric machine with coils.

FIG. 1 shows a schematic section through a star yoke structure 15 of an electric machine with coils 1. After the plugging in process, an exposed groove 22, which preferably has a constant width, for example 0.33 mm, over the groove depth, is formed between two coils 1 of two teeth 16. For this purpose, owing to the circular-path arrangement of the teeth 16 the turn cross-sectional dimensioning will increase continuously from the innermost turn 2 to the outermost one. In one dimensioning example, the width of a first turn is approximately 3.3 mm, the thickness is approximately 1 mm and the longitudinal side 112 mm, groove region 14. The dimensions of the turns then preferably increase, for example, in a way which is adapted to the groove geometry with the further turns provided with a width of approximately 10.6 mm, a thickness constant remaining of approximately 1 mm× and a longitudinal side of approximately 124 mm. The insulation between two turns is of approximately 0.2 mm thickness. In the case of a first turn, the interruption 4 is approximately 3 mm up to 5 mm in width at the top turn, and the conductive connection 7 is approximately 5 mm in width.

Figure 2:
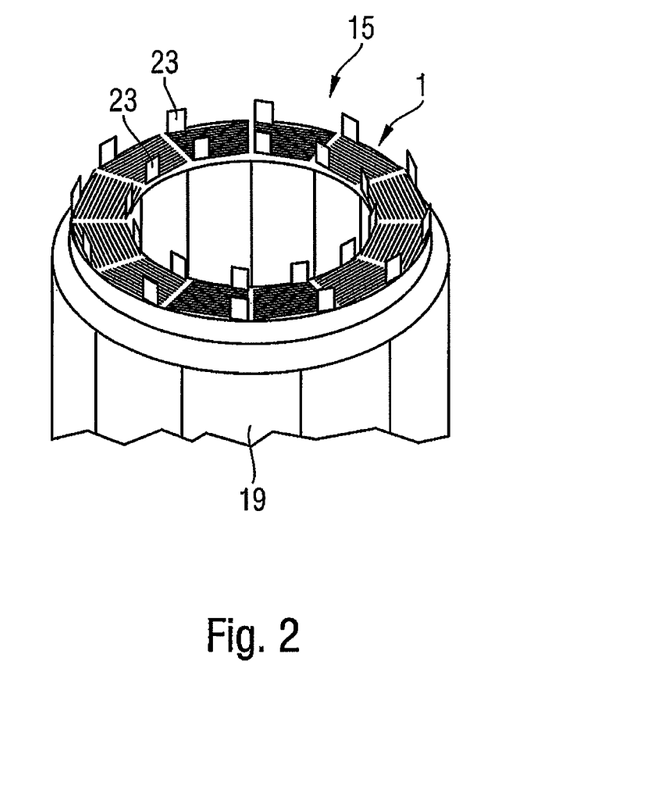
FIG. 2 shows a star yoke structure in an electric machine.

FIG. 2 shows a star yoke structure 15 with coils 1 on all the teeth 16 in an electric machine. The contact regions 23 which project out in a way which corresponds to winding ends, of the coils 1 are provided as contact points for the current connection of the power supply.

Figure 3:
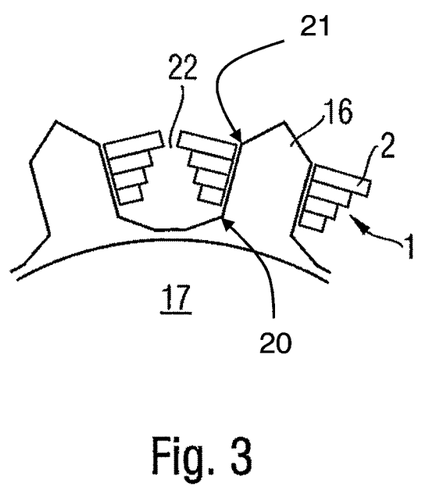
FIG. 3 shows a section through a star with coils.

FIG. 3 shows a schematic section through a star 17. The turns 2 are illustrated schematically, with the result that the smallest turn 2 bears against the foot region 20 of the tooth 16, and is constructed followed by continuously larger turns 2 up to the largest turn 2 at the shoulder region 21 of the tooth 16.

Figure 4:
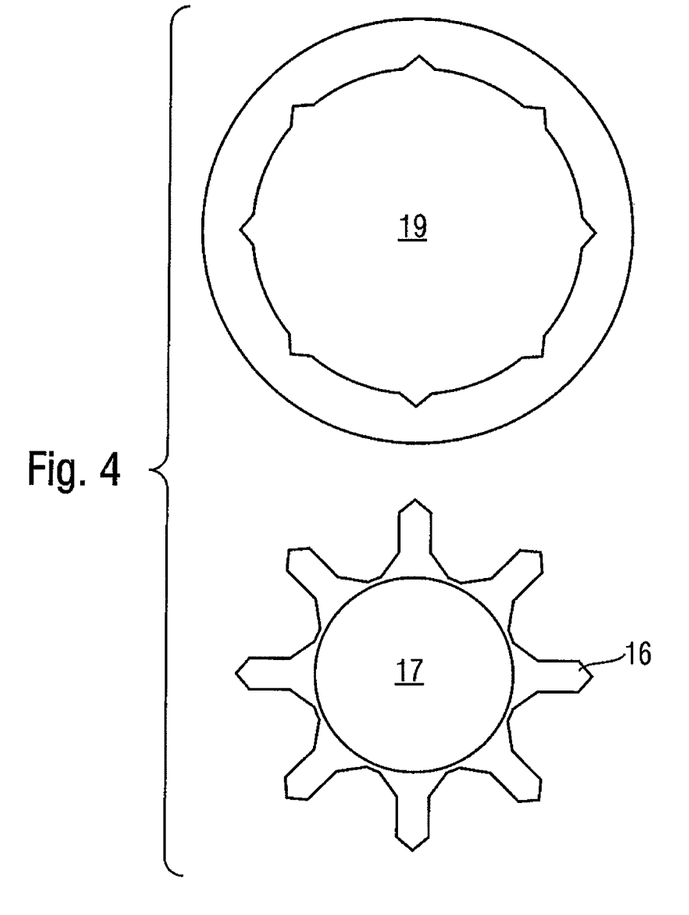
FIG. 4 shows a schematic sectional illustration of a star yoke.

FIG. 4 shows a schematic sectional illustration of a star 17 with teeth 16 and a yoke 19 into which the star 17 is inserted as soon as the coils 1 are fitted onto the teeth 16.

Figure 5:
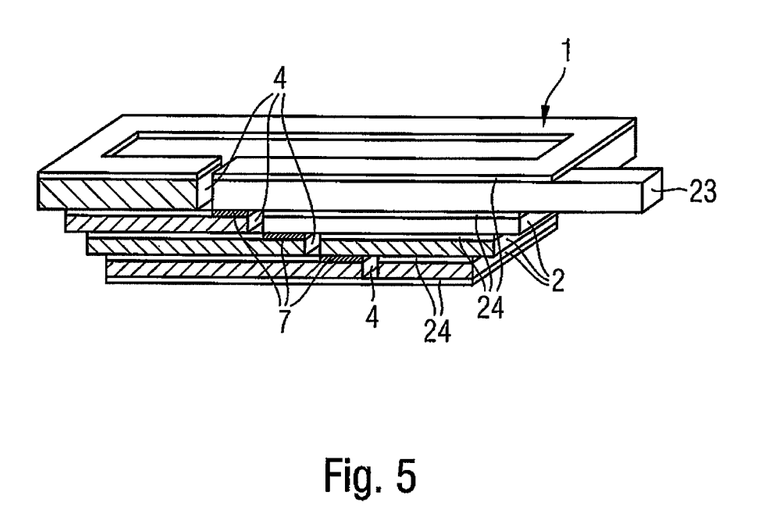
FIG. 5 shows a schematic perspective illustration of part of a coil, FIGS. 6a, b, c show schematic illustrations of turns of a coil, and FIGS. 7a, b show schematic illustrations of turns of a coil.

FIG. 5 shows a schematic perspective illustration of part of a coil 1. The turns 2 which are arranged one on top of the other are each separated by insulation layers 24. Each turn 2 has an interruption 4 and is placed in contact with an adjacent turn 2 by means of a connection 7. The outermost turn 2 has a winding end with a contact region 23 for the application of a current.

Figure 6A:
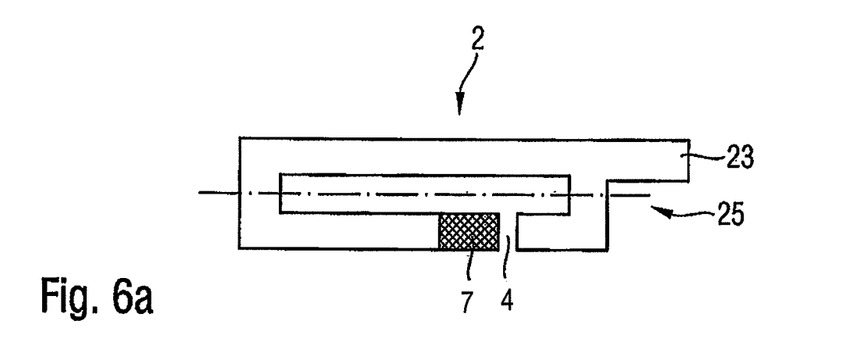
Figure 6B:
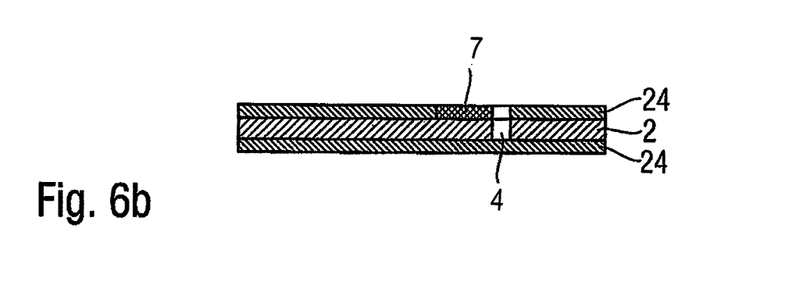
Figure 6C:
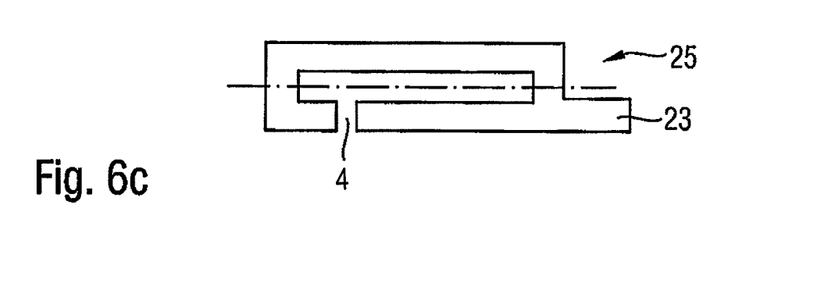

FIG. 6 shows a schematic illustration of turns 2 of a coil 1 in a plan view and in cross section.

FIG. 6a) shows by way of example a turn 2 from the foot region of a tooth 16 which has a contact region 23 for a current connection at a winding end on a narrow side 25 of the coil 1, and a conductive connection 7 to an adjacent turn 2.

FIG. 6b) shows a cross section through a turn 2 of FIG. 6a including two adjacent insulation layers 24 and an electric connection 7 between two turns 2.

FIG. 6c) shows a turn 2, wherein the contact region 23 is provided at a different position of the winding end of a narrow side 25.

Figure 7A:
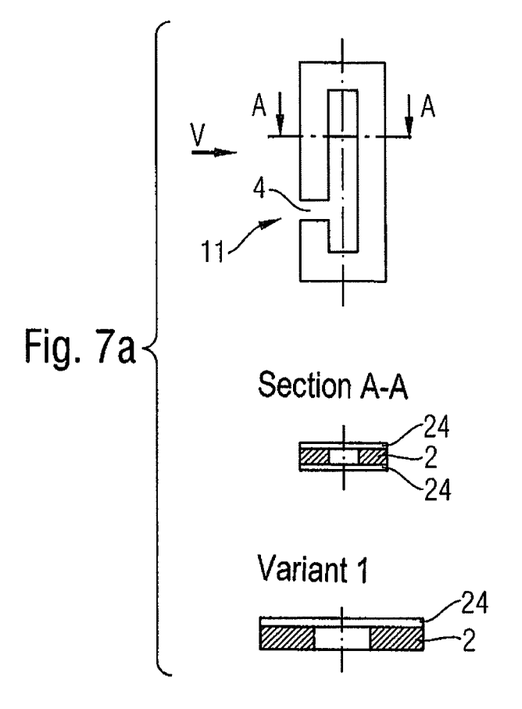
Figure 7B:
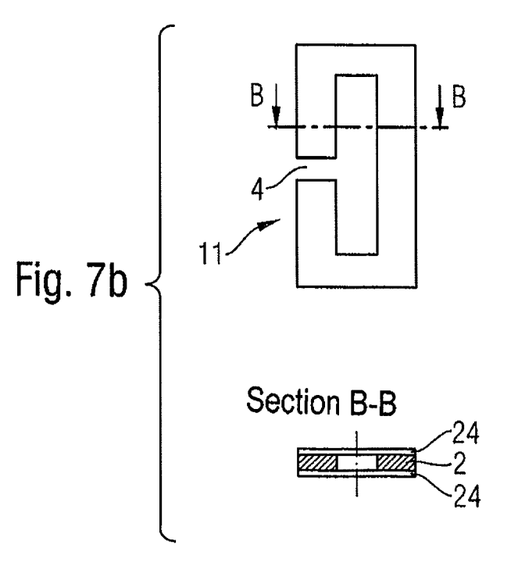

FIGS. 7a) and b) show schematic illustrations of turns 2 of a coil 1. The turns 2 have interruptions 4 which are arranged offset, and different widths of the conductor tracks, wherein a is made narrower and b is made wider. In the section AA and BB, respectively, it becomes clear that the turns are insulated with insulating layers, wherein a conductive connection is formed in each case to turns which are adjacent directly or else further away. Variant 1 shows that a one-sided insulation 24 can also be provided. The interruptions are arranged on the longitudinal side of the turns 2 in order to allow a simplified assembly of the coil from the turns, wherein insertion into the tooth then preferably only occurs subsequently.

LIST OF REFERENCE NUMERALS

1 Coil
2 Turn
4 Interruption
7 Connection
11 Longitudinal side
14 Groove region
15 Star yoke structure
16 Tooth
17 Star
19 Yoke
20 Foot region
21 Shoulder region
22 Groove
23 Contact region
24 Insulating layer
25 Narrow side

The invention claimed is:

1. A coil for an electric machine for conducting an electric current for generating a magnetic field, the coil comprising:
individual turns which are embodied from a conductive sheet-metal strip material, and the turns are embodied generally as flat bodies of rectangular shape comprising two narrow sides and two long sides, in such a manner that a dense package with turns arranged one on top of the other is obtained, and each turn has at least one circumferential conductor track with the exception of at least one electrical interruption on one of the long sides resulting in a first end and a second end of the turn, and the conductor track of a turn at one location has an electrically conductive connection to a conductor track of an adjacent turn, wherein the turns are, apart from this, substantially electrically insulated from one another, and wherein a contact region for a current connection is provided at at least one end-side turn of the coil, wherein the contact region extends from one of the narrow sides of the end-side turn and provides a third end of the end-side turn and wherein the coil is adapted to be fittable onto a tooth of a star in the sense of an individual tooth coil, wherein a periphery of each tooth has a substantially constant outer diameter and wherein all the turns of the individual tooth coil are made narrower in the vicinity of a foot region of a tooth than in a shoulder region of a tooth and are sized to form an exposed groove with an adjacent coil, wherein an entirety of the exposed groove has a width which increases from the shoulder region to the foot region.

2. The coil as claimed in claim 1, wherein the interruptions between adjacent turns are arranged offset and/or wherein the electrically conductive connections between adjacent turns are arranged offset, wherein the electrically conductive connection is arranged in the direct vicinity of the interruption of a turn.

3. The coil as claimed in claim 1, wherein the interruptions and/or the electrically conductive connections of the turns for each of the successive turns are each arranged offset by a predetermined distance with respect to the connection and/or the interruption of the preceding turn.

4. The coil as claimed in claim 1, wherein the interruptions and/or the electrically conductive connections of the turns are arranged on one longitudinal side of the coil.

5. The coil as claimed in claim 1, wherein the turns are embodied as flat bodies of rectangular shape and wherein a dimension of each turn increases from the foot region to the shoulder region.

6. The coil as claimed in claim 1, wherein the turns are punched from a conductive sheet-metal copper strip.

7. The coil as claimed in claim 1, wherein the turns, with the exception of the electrically conductive connection, are electrically insulated from one another by means of a thin insulating layer made of paper and/or varnish and/or oxide.

8. The coil as claimed in claim 1, wherein the electrically conductive connection between the turns is formed by means of hard soldering and/or mechanical pressure and/or soldering under a protective gas atmosphere or the like.

9. The coil as claimed in claim 1, wherein the coil is constructed and arranged to be assembled outside the electric machine, including the electrically conductive connections between the turns, and is to be only subsequently inserted into the electric machine.

10. The coil as claimed in claim 9, wherein after the assembly, the coil is introduced into a stator in such a way that the interruptions and/or the electrically conductive connections are arranged in a groove region of the stator.

11. The coil as claimed in claim 1, wherein the interruption is embodied in a way which is adapted in accordance with the electrical requirements.

12. The coil as claimed in claim 1, wherein the contact region is provided with a solder strip for a soldering process, in particular with a tin layer, and/or wherein, insulation is removed in the contact region and/or wherein the contact region has welding beads or welding bumps for the further formation of electrical contact.

13. The coil as claimed of claim 1, wherein the turns are provided with a corrosion-reducing or corrosion-protection layer.

14. The coil as claimed in claim 1, wherein the two end-side turns each have a contact region, wherein the two contact regions of the end-side turns are arranged at a winding end, and/or in each case a contact region is provided at one of two winding ends lying opposite one another.

15. The coil as claimed in claim 1, wherein before electrical contact is formed, the turns, with the exception of the regions of the electrically conductive connections of the turns to one another, are provided with an adhesive layer for a bonding process which can be activated thermally, wherein the adhesive layer is thicker than the insulating layer.

16. A stator of an electromechanical converter with an internal rotor or external rotor, the stator comprising:
at least one coil having individual turns which are embodied from a conductive sheet-metal strip material, and the turns are embodied generally as flat bodies of rectangular shape comprising two narrow sides and two long sides, in such a manner that a dense package with turns arranged one on top of the other is obtained, and each turn has at least one circumferential conductor track with the exception of at least one electrical interruption on one of the long sides, and the conductor track of a turn at one location has an electrically conductive connection to a conductor track of an adjacent turn, wherein the turns are, apart from this, substantially electrically insulated from one another, wherein a contact region for a current connection is provided at at least one end-side turn of the coil, wherein the contact region extends from one of the narrow sides of the end-side turn and provides a third end of the end-side turn, and
a star yoke structure, wherein the coil is fitted onto a tooth of a star in the sense of an individual tooth coil, wherein a periphery of each tooth has a substantially constant outer diameter and wherein all the turns of the individual tooth coil are made narrower in the vicinity of a foot region of a tooth than in a shoulder region of a tooth and are sized to form an exposed groove with an adjacent coil, wherein an entirety of the exposed groove has a width which increases from the shoulder region to the foot region.

17. The stator as claimed in claim 16, wherein a plurality of coils are provided with a common contact unit on their contact regions in order to simultaneously make contact with a plurality of coils.

18. A method for producing a coil, the method comprising:
providing rectangular flat turns which are embodied from a conductive sheet-metal strip material and wherein each rectangular flat turn comprises two narrow sides and two long sides, and which have a gap-shaped interruption in one of the long sides,
arranging the flat turns one on top of the other and in each case adjacent turns are connected by means of a conductive connection in the longitudinal region using a connecting method,
assembling the coil outside the electric machine, including the electrically conductive connections between the turns, and
subsequently inserting the coil into the electric machine,
wherein a contact region for a current connection is provided at at least one end-side turn of the coil, wherein the contact region extends from one of the narrow sides of the end-side turn and provides a third end of the end-side turn and wherein the coil is adapted to be fittable onto a tooth of a star in the sense of an individual tooth coil, wherein a periphery of each tooth has a substantially constant outer diameter and wherein all the turns of the individual tooth coil are made narrower in the vicinity of a foot region of a tooth than in a shoulder region of a tooth and are sized to form an exposed groove with an adjacent coil, wherein an entirety of the exposed groove has a width which increases from the shoulder region to the foot region.

19. The method as claimed in claim 18, wherein the electrically conductive connections between the turns are formed simultaneously between a plurality of turns or all the turns, by means of hard soldering under a protective gas atmosphere and/or mechanical pressure or the like.

20. The method as claimed in claim 18, wherein a bonding agent which can be activated thermally is used for mechanically securing the turns to one another before the turns are insulated from one another.

21. A method for producing a stator, the method comprising:
providing at least one coil having individual turns which are embodied from a conductive sheet-metal strip material, and the turns are embodied generally as flat bodies of rectangular shape, wherein each rectangular flat turn comprises two narrow sides and two long sides, in such a manner that a dense package with turns arranged one on top of the other is obtained, and each turn has at least one circumferential conductor track with the exception of at least one electrical interruption on one of the long sides, and the conductor track of a turn at one location has an electrically conductive connection to a conductor track of an adjacent turn, wherein the turns are, apart from this, substantially electrically insulated from one another, and wherein a contact region for a current connection is provided at at least one end-side turn of the coil, wherein the contact region extends from of the narrow sides of the of the end-side turn and provides a third end of the end-side turn, and
providing a star yoke structure,
wherein the coil is formed by stacking up individual flat turns outside the stator and is soldered together in order to produce individual, electrically conductive connections in a groove region of the stator, and the coil is subsequently fitted as a coil package onto one tooth of a star of a star yoke structure in the sense of an individual tooth coil, wherein a periphery of each tooth has a substantially constant outer diameter, and subsequently after the fitting onto the star, the star is inserted into a yoke, wherein all the turns of the individual tooth coil are made narrower in the vicinity of a foot region of a tooth than in a shoulder region of a tooth and are sized to form an exposed groove with an adjacent coil, wherein an entirety of the exposed groove has a width which increases from the shoulder region to the foot region.

* * * * *